Figure 1:
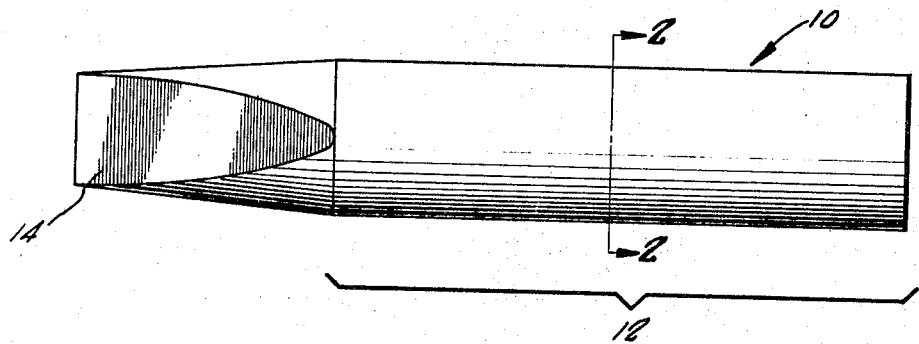

April 25, 1967          G. M. KENT          3,315,350

METHOD OF MANUFACTURING REPLACEABLE SOLDERING IRON TIPS

Filed Dec. 27, 1963

INVENTOR.
GEORGE M. KENT
BY
Christie, Parker & Hale
ATTORNEYS.

United States Patent Office 3,315,350
Patented Apr. 25, 1967

3,315,350
METHOD OF MANUFACTURING REPLACEABLE SOLDERING IRON TIPS
George M. Kent, San Gabriel, Calif., assignor to Plato Products, Inc., El Monte, Calif., a corporation of California
Filed Dec. 27, 1963, Ser. No. 333,867
3 Claims. (Cl. 29—529)

This invention relates to a method of producing soldering tips and in particular to a method of producing replaceable soldering tips that are heat and corrosion resistant.

Because soldering tips are subject to pitting and wear, it is desirable that the tips be replaced periodically. It has been the practice therefore to provide tips which can be removed from the heating element of the soldering iron to permit new tips to be used when the old tips wear out. Generally the soldering tip is arranged with a cylindrical shank that is inserted into an opening in the heating element of the soldering iron. It is retained in position by a set screw or a similar clamping means.

In order to ensure sufficient heat transfer between the heating element and the shank of the soldering tip, the shank must fit snugly in the opening of the heating element. However, at the elevated temperature occurring at the interface between the shank of the soldering tip and the surrounding heating element, oxidation of the metal surface of the soldering tip takes place. As the layer of oxide builds up it acts as an insulator cutting down the efficiency of heat transfer between the heating element and the soldering tip. Furthermore, the oxidation of the shank causes it to seize to the inside of the opening in the soldering iron making it virtually impossible to withdraw the soldering tip after a normal period of use.

Various techniques have been attempted to avoid the above-mentioned difficulties. One technique has been to provide a stainless steel sleeve fitted over the copper tip. While this is effective in preventing the tip diameter from enlarging with use, the heat transfer properties of the tip are greatly reduced because there is no molecular bond between the stainless steel and the copper. Electroplating of various materials over the copper tip has also been attempted but without great success. Such known methods of providing cladding have not been successful in fully preventing corrosion and seizing of the tip in the iron after a normal period of use.

The present invention is directed to an improved method of manufacturing replaceable soldering tips of the type in which a shank portion of the tip is inserted in the heating element of the soldering iron. In brief, the manufacturing method includes the steps of electroplating the entire copper tip with a heavy layer of another metal having a melting point substantially above the temperatrue developed in the soldering iron, preferably iron. The shank portion of the tip is then smoothed by grinding and polishing the surface of the electroplated layer. The smooth surface of the shank is then electroplated with a relatively thin layer of chromium or chromium over nickel. The resulting product is a soldering tip that, when inserted in the soldering iron, retains its dimensional stability indefinitely, permitting the tip to be removed at any time without difficulty. Moreover, the product produced by this method gives highly efficient heat transfer between the soldering iron and the tip, the high level of heat transfer efficiency being retained throughout the useful life of the tip.

Figure 2:
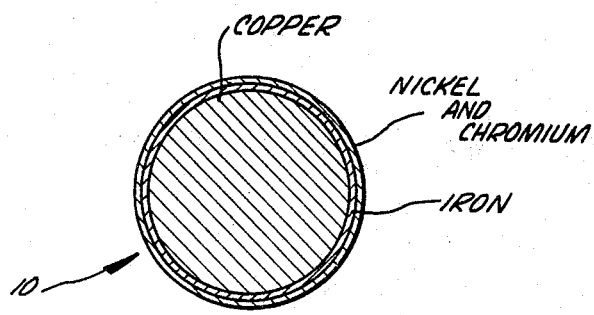

For a more complete understanding of the invention, reference should be made to the accompanying drawings wherein:

FIGURE 1 shows a soldering tip manufactured according to the method of the present invention; and
FIGURE 2 is an enlarged cross-sectional view taken on the line 2—2 of FIGURE 1.

Referring to the drawings, the numeral 10 indicates generally a replaceable soldering tip which includes a cylindrical shank portion 12 and a tapered end or tip portion 14. In normal use, the shank portion 12 is inserted into an opening in the core of the heating element of the soldering iron in such a way as to provide intimate contact between the tip over the length of the shank 12 with the surrounding heating element of the soldering iron. Normally the tip is made of solid copper because of its high heat conductivity. Copper, however, oxidizes readily at the elevated temperatures encountered at the interface between the copper soldering tip and the surrounding heating element.

According to the method of manufacture of the present invention, the copper soldering tip is electroplated with a layer of another metal or combination of metals having a melting point substantially above the temperature developed within the soldering iron. This layer is preferably iron, but nickel, cobalt or combinations thereof can be used but are not as satisfactory. It is necessary that this metal layer be electroplated to a substantial thickness to provide a strong shell around the shank of the tip. A minimum thickness of .002 inch up to a maximum thickness of .010 inch has been found to be the most satisfactory. Lesser thicknesses do not provide the necessary protection and greater thicknesses impair the heat transfer between the heating element and the copper soldering tip. After electroplating the iron shell, the surface of the shank 12 is smoothed by grinding, polishing, burnishing, machining or otherwise treating the surface of the electroplated layer to make it uniformly smooth.

After the smoothing operation, a final layer of corrosion resistant metal is electroplated on the surface of the shank. This is preferably a layer of chromium or a layer of nickel under a layer of chromium. This outer layer only need be of the order of .0004 inch in thickness but may be up to .005 inch in thickness without seriously affecting the efficiency of the soldering tip. Where nickel and chromium are used, the nickel layer is preferably .0004 to .002 inch in thickness and the outer surface of chromium is .0001 to .003 inch in thickness.

It should be noted that where an inner layer of iron is used with outer layers of nickel and chromium, within the desired thickness ranges, for example, a thickness of .005 inch for the iron layer, .001 inch for the nickel layer and .0005 inch for the chromium layer, of the total material deposited on the surface of the shank of the soldering tip, approximately 75% by weight is iron, approximately 18% by weight is nickel and approximately 7% by weight is chromium. This weight relationship approximates that of stainless steel. It has been found in practice that the temperatures generated within the heating element of industrial soldering irons are high enough and the exposure time to such heats are long enough to cause alloying of the three metals by diffusion. Thus the oxidation resistance and physical properties of the electroplated layers is enhanced with continued use of the soldering tip. This is important in providing a soldering tip in which the shank retains its dimensional stability over the useful life of the soldering tip, thus permitting the tip to be readily removed from the soldering iron whenever required for replacement.

It should also be noted that the grinding operation between the steps of electroplating the base layer of iron and the outer layers of nickel and chromium is very important to achieve the improved results. Electroplating of chromium does not permit the chromium to deposit ell in the recesses of an irregular surface. Electroplating of iron to the thicknesses required to achieve a strong shell around the copper shank results in irregularities in the surface. The grinding operation is therefore necessary to permit the chromium to be deposited on a smooth surface in order to achieve a continuous electroplated surface of chromium of uniform thickness. Without the grinding operation, the relatively thin layer of chromium does not give adequate protection against oxidation of the sub-layer of iron.

What is claimed is:

1. In the manufacture of soldering tips, the method comprising the steps of forming a soldering tip of solid copper with a cylindrical shank portion and a working end portion, electroplating at least the shank portion of the tip with iron to a thickness between .002 inch and .010 inch, grinding the shank of the soldering tip to form a smooth surface, electroplating the shank portion of the tip with nickel to a thickness of .0004 inch to .0020 inch, and electroplating the nickel with a layer of chromium to a thickness of .0001 inch to .0030 inch.

2. The process of making soldering tips heat and corrosion resistant comprising the steps of electroplating the tip to a thickness of at least .002 inch with a strong shell of metal selected from the class consisting of iron, nickel, and cobalt, smoothing the surface of the shank portion of the shell to remove any irregularities in the coating surface, electroplating an outer layer of chromium at least .0001 inch thick.

3. In the manufacture of soldering tips, the method comprising the steps of forming a soldering tip of copper with a cylindrical shank portion, electroplating at least the shank portion of the tip with a strong shell of metal selected from a class consisting of iron, nickel and cobalt, to a thickness of at least .002 inch, grinding the shank portion of the tip to form a smooth even surface, electroplating a layer on the shank portion only of nickel to a thickness of at least .0004 inch, and electroplating the nickel with a layer of chromium to a thickness of at least .0001 inch.

References Cited by the Examiner

UNITED STATES PATENTS

| | | | |
|---|---|---|---|
| 2,472,296 | 6/1949 | Hartnell | 228—54 X |
| 3,080,842 | 3/1963 | Rice | 228—54 |
| 3,109,231 | 11/1963 | Johnson | 228—54 X |
| 3,125,055 | 3/1964 | Lerner | 228—54 |

FOREIGN PATENTS

| | | |
|---|---|---|
| 115,759 | 8/1941 | Australia. |
| 487,178 | 6/1938 | Great Britain. |
| 674,661 | 6/1952 | Great Britain. |

JOHN F. CAMPBELL, *Primary Examiner.*

P. M. COHEN, *Assistant Examiner.*